United States Patent [19]

Cadée

[11] 4,308,940
[45] Jan. 5, 1982

[54] HYDRAULIC CONTROL FOR A CLUTCH

[75] Inventor: Theodorus P. M. Cadée, Goirle, Netherlands

[73] Assignee: Van Doorne's Transmissie B.V., Tilburg, Netherlands

[21] Appl. No.: 98,252

[22] Filed: Nov. 28, 1979

[30] Foreign Application Priority Data

Dec. 5, 1978 [NL] Netherlands .......................... 7811860

[51] Int. Cl.³ ..................... F16D 43/284; F16D 13/72
[52] U.S. Cl. ........................... 192/103 FA; 192/70.12; 137/56
[58] Field of Search .......... 192/70.12, 103 F, 103 FA, 192/104 F, 106 F, 85 F, 113 B, 3.31, 3.33; 137/56

[56] References Cited

U.S. PATENT DOCUMENTS

| | | | |
|---|---|---|---|
| 2,642,844 | 6/1953 | Flinn | 192/103 FA |
| 2,903,083 | 9/1959 | Kelley | 192/103 FA |
| 3,358,796 | 12/1967 | Hilpert | 192/103 FA |
| 3,542,174 | 11/1970 | Hattori | 192/103 FA |
| 3,556,271 | 1/1971 | Hilpert | 192/3.33 |
| 3,680,398 | 8/1972 | Schneider et al. | 192/103 FA |
| 3,712,437 | 1/1973 | Snyder | 192/103 FA |

*Primary Examiner*—George H. Krizmanich
*Attorney, Agent, or Firm*—Cushman, Darby & Cushman

[57] ABSTRACT

Apparatus for controlling a clutch operable by fluid pressure in an operation space includes a fluid supply conduit, a rotatable control valve with a valve member displaceable by centrifugal force against the force of a biasing spring for connecting the fluid supply conduit to the operation space, and a fluid connection between the operation space and the valve member for supplying fluid pressure from the operation space to the valve member in a direction against the centrifugal force.

10 Claims, 3 Drawing Figures

HYDRAULIC CONTROL FOR A CLUTCH

BACKGROUND

The invention relates to an apparatus for controlling a clutch operable by means of fluid pressure. Such a clutch is described inter alia in U.S. Pat. No. 3,602,347 and in Dutch Patent application No. 71,12942.

Such a clutch may be used for the take-off of a motor vehicle, whereby the motor of the vehicle for a short period of time drives the wheels of the vehicle through slippage of the clutch. Often such a take-off clutch is connected in series with a reversing clutch or a unit with the same function, such as a gearbox, in order to shift the driving direction (forward or reverse). However, it is also possible to integrate the take-off and the reversing clutch, whereby the reversing clutch is provided with two take-off clutches, one for forward take-off, one for reverse take-off.

The clutch of the present type may include a plate-type friction coupling. The plates may be dry or wet and in the latter case the pressure fluid used to operate the clutch may be used to cool the plates. The clutch may also be provided with a hand brake pulled radially inwardly about a cylindrical surface. Naturally, many constructional variants are possible.

SUMMARY OF THE INVENTION

The invention concerns the hydraulic operation of such a clutch, i.e. concerns the manner in which a fluid pressure is built up in an operation space in order to bring the clutch into engagement. This engagement during, e.g. the take-off of a vehicle, should be effected at a given clutch engagement characteristic.

Partly depending on the engine speed and/or the engine torque, a specific slip should be present at least for a period of time, whereby it is of particular importance that the engagement takes place gradually and without shocks.

The object of the invention is to provide an apparatus for controlling a hydraulically operated clutch, whereby with a relatively simple and reliable construction, an advantageous engagement characteristic can be obtained.

The control apparatus according to the invention includes a rotatable control valve assenbly having a valve member movable by centrifugal force against spring action for connecting a fluid supply conduit to the operation space, whereby the valve member is likewise loadable against the centrifugal force by the fluid pressure in the operation space.

The valve member of the control valve assembly, which for instance rotates with the input shaft of the clutch or the crankshaft of the drive motor, upon increasing speed, will be displaced outwardly under influence of the centrifugal force, against the spring action. Initially, the fluid supply conduit is shut off, so that no fluid pressure can build up in the operation space. At sufficient rotation speed of the control valve, however, a fluid connection will be effected between the fluid supply conduit and the operation space, whereby a fluid pressure is built up in the operation space. Since this fluid pressure likewise exerts an influence counteracting the centrifugal force, there is created a desired speed range, wherein the fluid pressure in the operation space is lower than that in the fluid supply conduit.

Furthermore, according to the invention, the valve member may also be loaded by the fluid pressure in the fluid supply conduit, thus enabling through variation of the supply pressure, to influence the engagement characteristic of the clutch.

The decrease of the fluid pressure in the operation space, as well as a desired throughflow at an equilibrium position of the valve member, may be achieved by fluid leakage or discharge in a different manner, preferably, however, according to a further feature of the invention, fluid may be discharged from the operation space towards the friction portion of the clutch, in order to cool same. This cooling is then discontinued in the absence of fluid pressure in the operation space and moreover no additional cooling fluid supply conduit is required.

According to another feature of the invention this fluid supply to the friction portion may be closed by the valve member, when such a rotation speed is attained that substantially no slip occurs, in that the valve member has been displaced sufficiently far, e.g. under influence of the centrifugal force. Such displacement may also be effected differently, e.g. by a pressure increase in the fluid supply conduit.

It is also possible according to the invention that the valve member in case of sufficient displacement, eliminates the load by the fluid pressure in the operation space, i.e. shuts off the fluid connection between the operation space and the fluid pressure space for loading the valve member. It can thereby be achieved that the valve member is not radially inwardly displaced until at a rotation speed lower than the rotation speed which is necessary for outward displacement. This may be important if on the one end, for take-off, a higher engine speed is desired where slip occurs (e.g. up to 2200 rev. per minute of the motor), while on the other end, once the vehicle is driving, it should be possible to drive without slip of the clutch at a lower engine speed. (e.g. 1500–1800 rev. per minute).

BRIEF DESCRIPTION OF THE DRAWINGS

Three embodiments of the invention are illustrated in the accompanying drawings in which.

DETAILED DESCRIPTION

Figure 1:
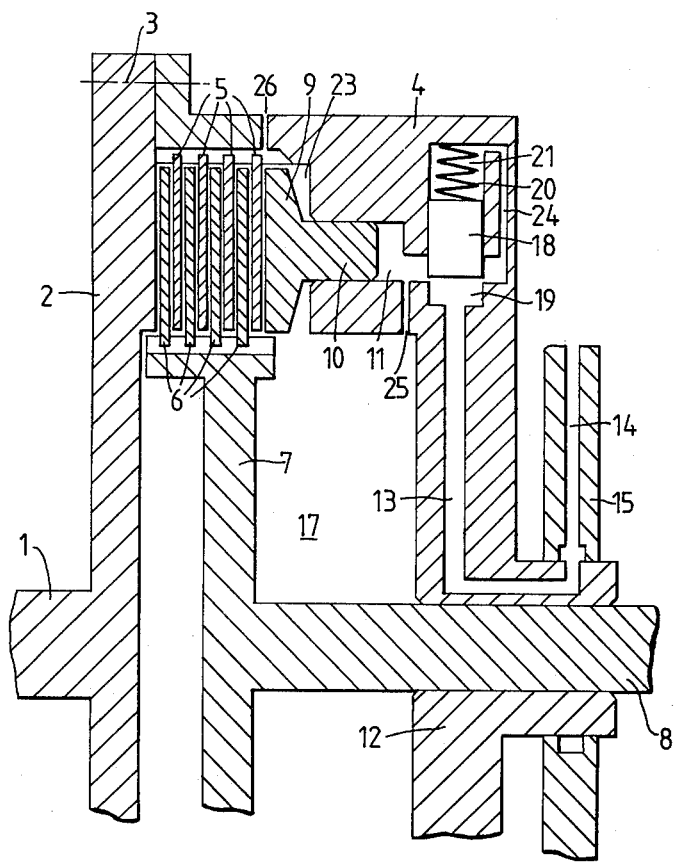
FIG. 1 is a schematic cross-sectional view of a first embodiment of a clutch.
Figure 2:
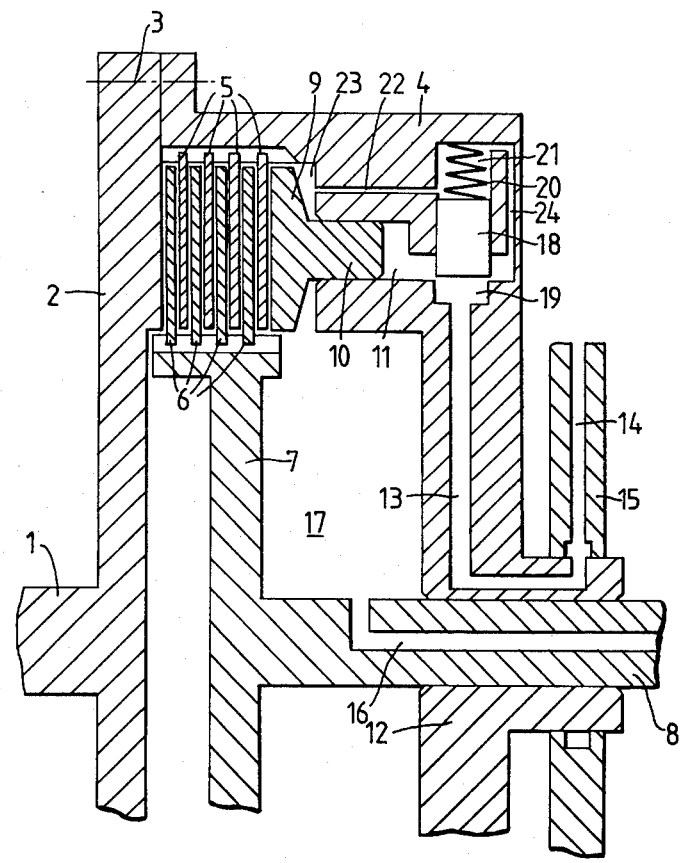
FIGS. 2 and 3 are schematic cross-sectional views of second and third embodiments of a clutch.
Figure 3:
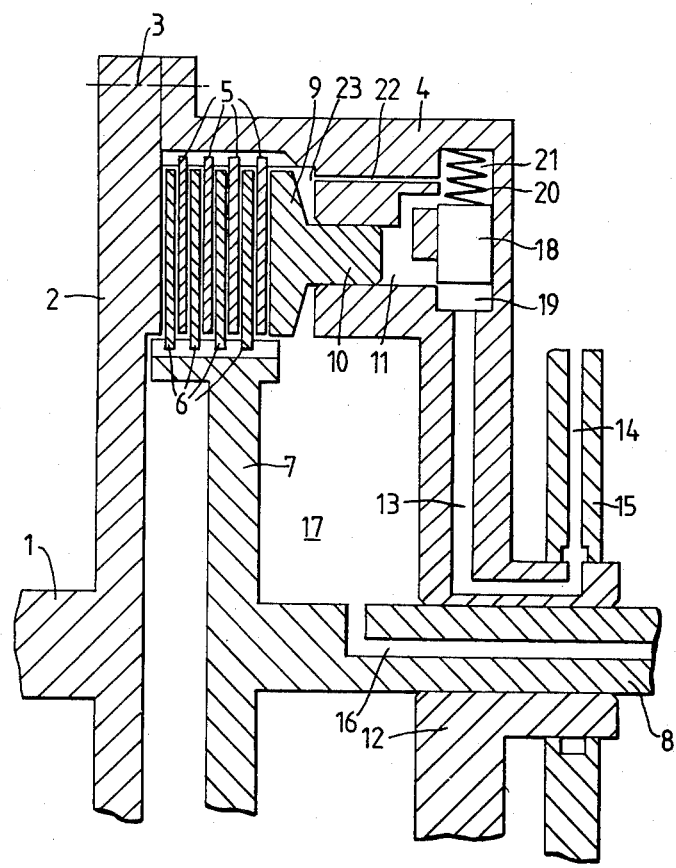

In FIGS. 1, 2 and 3 corresponding parts are indicated by identical reference numerals. The clutch illustrated in the drawings is provided with an input shaft 1 to which is attached a flange 2, which can likewise serve as a flywheel. Flange 2 is attached, e.g. through bolts, illustrated schematically at 3, to a clutch housing 4, which consequently rotates together with the input shaft 1. Four annular clutch plates 5 are mounted on the interior of the clutch housing 4 for axial movement relative to the housing 4. Four other annular clutch plates 6 are connected for axial movement to a disc 7 which is coaxial with and connected to the output shaft 8 of the clutch. The clutch plates 5 and 6 alternate with each other.

The clutch also includes an axially movable annular pressure body 9, which is provided with an annular portion 10 acting as a piston in a substantially annular recess or cylinder in the clutch housing 4 under influence of fluid pressure in the operation space 11 of the recess.

The housing 4 includes a portion 12 mounted about the output shaft 8. This portion 12 contains a fluid supply conduit 13 which extends between a space 19 and a conduit 14 in a stationary wall 15. The housing 4 also accommodates a control valve assembly having a radially movable valve member 18, which on the outer end is loaded by a helical compression spring 20 and by fluid pressure in a space 21. The inner end of the valve member 18 is slidable in the space 19.

Upon rotation of the clutch housing 4 the valve member 18, depending on the rotation speed, is subjected to a radially outwardly directed centrifugal force. Upon displacement of the valve member 18 outwardly, there is created a connection between the fluid supply conduit 13, via the space 19 to the operation space 11. Thus the pressure body 9 is displaced to the left in the drawing and the clutch plates 5,6 are pressed against each other and against the flange 2. The extent of the thus-effected friction (slip) between the input shaft 1 and the output shaft 8 depends on the magnitude of the fluid pressure in the operation space 11.

In the FIG. 1 construction, the housing 4 includes a fluid conduit 24 which allows the fluid pressure in the operation space 11 to likewise prevail in the space 21. The housing 4 also includes a fluid conduit 25 for restricted fluid flow between the operation space 11 and a space 17 formed between the housing portion 12 and the disc 7. There is also a fluid conduit 26 through which the fluid from the space 17 can flow away outwardly via clutch plates 5,6 and space 23 to for example a sump outside the clutch housing. This may be desirable for cooling the clutch plates 5,6.

The apparatus of FIG. 1 is operated as follows.

In case of little or no rotation speed of the input shaft 1 (and the clutch housing 4) the valve member 18 will be pressed inwardly by the helical spring 20 in such a way that the fluid supply conduit 13 is shut off and there is no fluid pressure in the operation space 11 because the fluid in the space 11 may flow away via the conduit 25.

At a given rotation speed of the input shaft 1 and the housing 4, the valve member 18 under the influence of centrifugal force, will start to move radially outwardly, thus creating a fluid connection between the fluid supply conduit 13 and the operation space 11 via the space 19. Since the conduit 25 allows only a restricted throughflow out of the space 11, partly depending on the pressure in the conduit 13, there is a build up of fluid pressure in the operation space 11, which fluid pressure likewise exerts via the conduit 24 and the space 21 a radially inwardly directed force on the valve member 18. The valve member 18 has thus the tendency to again shut off the fluid supply to the operation space 11. There is thus produced, depending on the rotation speed of the input shaft 1, an equilibrium position of the valve member 18.

At a sufficiently high rotation speed, there is formed an unlimited fluid connection between the fluid supply conduit 13 and the operation space 11, whereby the supplied fluid pressure should be such that there exists sufficient friction between the clutch plates 5,6, so that no slip occurs any longer.

It will be clear that slippage of the clutch occurs in a specific speed range of the input shaft 1, whereby the valve member 18 in an equilibrium condition, is adapted to restrict the fluid flow between the supply conduit 13 and the operation space 11. By feedback of the fluid pressure prevailing in the operation space 11 to the equilibrium of forces on the valve member 18, there may now be obtained a desired slip characteristic of the clutch.

Another advantage of the present apparatus is the fact that, as long as the fluid pressure in the operation space 11 is low, so that a larger pressure difference is present over the valve member 18, a large fluid supply to the operation space 11 can take place, which may be important if the pressure member 9 has first to traverse a given path before the clutch plates 5,6 touch each other. Only when the clutch plates 5,6 touch each other, can there be a buildup of fluid pressure in the operation space 11 and thereby in the space 21.

The embodiment shown in FIG. 2 is operated in a similar manner. However, in the FIG. 2 construction the cooling of the clutch plates 5,6 takes place by a fluid flow from the space 21, via a conduit 22 with restricted throughflow, to the space 23, which fluid is then discharged via a space 17 and a conduit 16 which is disposed in the output shaft 8. In this embodiment the cooling is disconnected if there is no pressure buildup in the operation space 11, and if such a speed is attained that the valve member 18 shuts off the conduit 22 by radial displacement outwardly. Thereby the fluid pressure in the operation space 11 is maximal so that there is practically no clutch slip.

The FIG. 3 embodiment operates in generally the same way. However, in the FIG. 3 embodiment disconnection of cooling is effected by providing that the passage between the operation space 11 and the loading space 21 becomes closed by further outward displacement of the valve member 18. When this passage becomes closed there is, of course, no flow through the conduit 22. For the radial inward displacement of the valve member 18, consequently, a lower speed of the input shaft 1 is required than the speed at which the centrifugal force is sufficiently large to outwardly displace the valve member 18 inter alia against the fluid pressure in space 21. The clutch once being in engagement thus continues to be completely in engagement at speeds that are lower than those at which initially slip occured.

In all three embodiments a variation of the fluid pressure in the supply conduit 13 may influence the clutch engagement characteristic in that the fluid pressure via the space 19 exerts a radially outwardly directed force on the valve member 18, i.e. coacting with the centrifugal force to build up a fluid pressure in the operating space 11. This may be of importance as external, additional control possibility.

Moreover, in the embodiments it is possible to build in the required restrictions, e.g. in the fluid conduit 24, in order to effect a retarded displacement of the valve member 18. Upon the rapid increase of the input speed, the clutch will then come into engagement at a higher speed, which may be desirable.

Naturally, the embodiments should only be seen as examples and many variants are possible, whereby especially types of clutches other than wet plate clutches and a different construction are possible.

What is claimed is:

1. An apparatus for controlling a clutch operable by means of a fluid pressure in an operation space, said apparatus comprising a fluid supply conduit, a rotatable control valve with a valve member displaceable by centrifugal force against the force of a biasing spring for connecting the fluid supply conduit to the operation space, and a fluid connection between the operation space and the valve member for supplying fluid pressure from the operation space to the valve member in a direction against the centrifugal force.

2. An apparatus as in claim 1 wherein the valve member is also loadable by the fluid pressure in the fluid supply conduit.

3. An apparatus as in claims 1 or 2 wherein the clutch includes clutch plates which are bathed in the fluid used to control the clutch, said apparatus further including means providing for the limited outflow of fluid from the operation space to the clutch plates.

4. An apparatus as in claim 3 wherein said means for providing limited outflow of fluid is closable by displacement of the valve member.

5. An apparatus according to claim 1 or claim 2 wherein said valve member, by further displacement against the force of the spring, closes said fluid connection between the operation space and the valve member.

6. In a clutch having a rotary input, a rotary output, an engageable and disengageable friction coupling between the input and the output, a fluid pressure supply conduit for supplying fluid to an operation space, and a fluid pressure operated device responsive to the pressure in the operation space for engaging and disengaging the friction coupling, an improved control for said fluid operated device comprising: a fluid pressure control valve assembly rotatable upon rotation of the input, the valve assembly including a valve member displaceable by centrifugal force during rotation of the valve assembly in mode to pass fluid pressure from said supply conduit to said operation space; spring means biasing said valve member in a direction opposite to the direction of displacement by centrifugal force; and fluid connection means for passing fluid pressure from said operation space to the valve member in a mode to load the valve member in the same direction as said spring.

7. A clutch as in claim 6 including means for passing fluid pressure from said fluid supply conduit to said valve member in a mode to load said valve member in the same direction as said spring when said valve member has been moved a predetermined distance by centrifugal force.

8. A clutch as in claim 6 or claim 7 wherein the friction coupling is bathed in the fluid used to operate said fluid pressure operated device, said control further including conduit means for passing a restricted flow of fluid from said operation space to said friction coupling.

9. A clutch as in claim 8 wherein said conduit means for passing a restricted flow of fluid is arranged to be closed by displacement of said valve member to a predetermined position by centrifugal force.

10. A clutch as in claim 6 or claim 7 wherein said valve member is arranged to close said fluid connection means upon movement of said valve member to a predetermined position by centrifugal force.

* * * * *